United States Patent [19]

Novak

[11] Patent Number: 5,537,048

[45] Date of Patent: Jul. 16, 1996

[54] SENSING ROLLER FOR IN-PROCESS THICKNESS MEASUREMENT

[75] Inventor: James L. Novak, Albuquerque, N.M.

[73] Assignee: Sandia Corporation, Albuquerque, N.M.

[21] Appl. No.: 213,438

[22] Filed: Mar. 14, 1994

[51] Int. Cl.$^6$ .................................................. G01R 27/26
[52] U.S. Cl. .......................... 324/690; 324/671; 324/687; 324/688; 324/701
[58] Field of Search .................................. 324/515, 671, 324/687, 688, 690, 662, 701; 340/675, 676, 677; 73/159, 160

[56] References Cited

U.S. PATENT DOCUMENTS

| | | | |
|---|---|---|---|
| 3,676,933 | 7/1972 | Slone | 33/147 L |
| 3,730,086 | 5/1973 | Dauterman | 101/148 |
| 4,207,141 | 6/1980 | Seymour | 162/49 |
| 4,426,785 | 1/1984 | Loftus et al. | 33/147 L |
| 4,593,244 | 6/1986 | Summers et al. | 324/230 |
| 4,623,835 | 11/1986 | Mehdizadeh et al. | 324/58.5 R |
| 4,677,578 | 6/1987 | Wright et al. | 364/562 |
| 4,682,105 | 7/1987 | Thorn | 324/230 |
| 4,862,065 | 8/1989 | Pazda et al. | 324/65 R |
| 4,958,131 | 9/1990 | Thorn | 324/708 |
| 4,959,040 | 9/1990 | Gardner et al. | 474/103 |
| 4,968,947 | 11/1990 | Thorn | 324/701 |
| 5,001,435 | 3/1991 | Smith | 324/671 |
| 5,095,278 | 3/1992 | Hendrick | 324/687 |
| 5,212,452 | 5/1993 | Mayer et al. | 324/687 |
| 5,281,921 | 1/1994 | Novak | 324/671 |

FOREIGN PATENT DOCUMENTS

| | | | |
|---|---|---|---|
| 1522852 | 4/1968 | France | 324/701 |
| 1257306 | 12/1971 | United Kingdom | 324/671 |

OTHER PUBLICATIONS

Advertisement, strip-edge scanner, marketed by ABB Automation AB, Vasteras, Sweden 1993 (month unavailable).
Advertisement, rotary electrical contact assemblies by Rotocon, Meridian Laboratory, Middleton, Wisconsin (date unavailable).
Kranbuehl, D. E., "In-situ On-line Measurement of Composite Cure with Frequency Dependent Electromagnetic Sensors," *Plastics, Rubber and Composites Processing and Applications*, vol. 16, No. 4, pp. 213–219, (1991) (month unavailable).

*Primary Examiner*—Kenneth A. Wieder
*Assistant Examiner*—Glenn W. Brown
*Attorney, Agent, or Firm*—Jeffrey D. Myers; Donovan F. Duggan

[57] ABSTRACT

An apparatus and method for processing materials by sensing roller, in which the sensing roller has a plurality of conductive rings (electrodes) separated by rings of dielectric material. Sensing capacitances or impedances between the electrodes provides information on thicknesses of the materials being processed, location of wires therein, and other like characteristics of the materials.

21 Claims, 4 Drawing Sheets

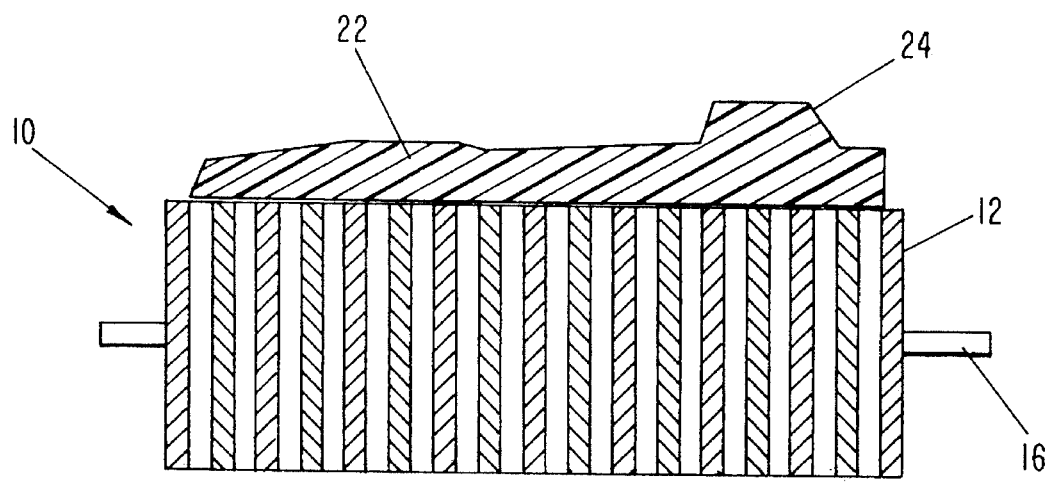
FIGURE — 2A
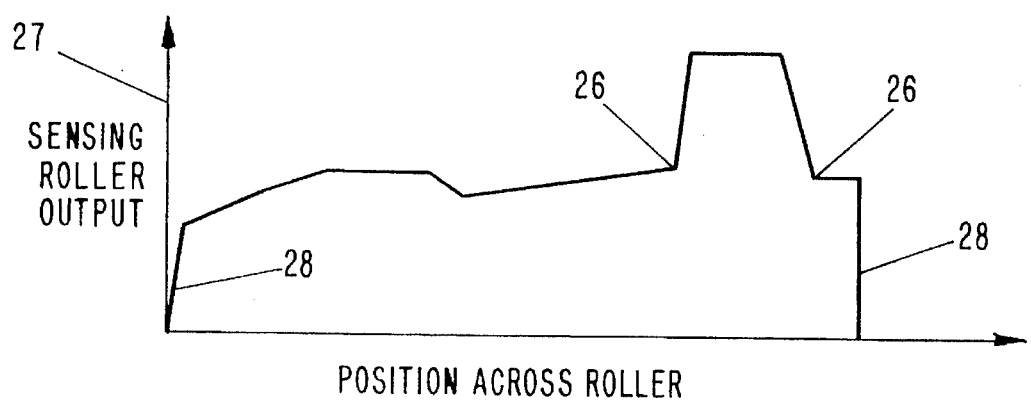
FIGURE — 2B

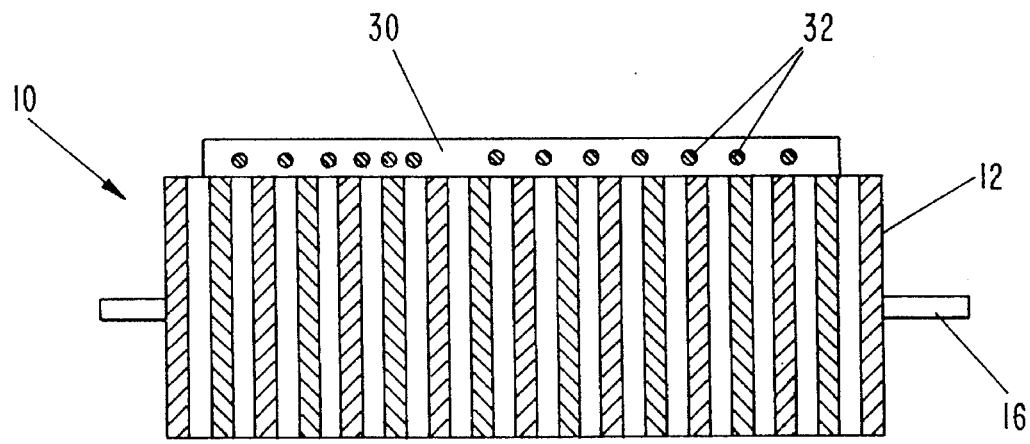
FIGURE — 3A
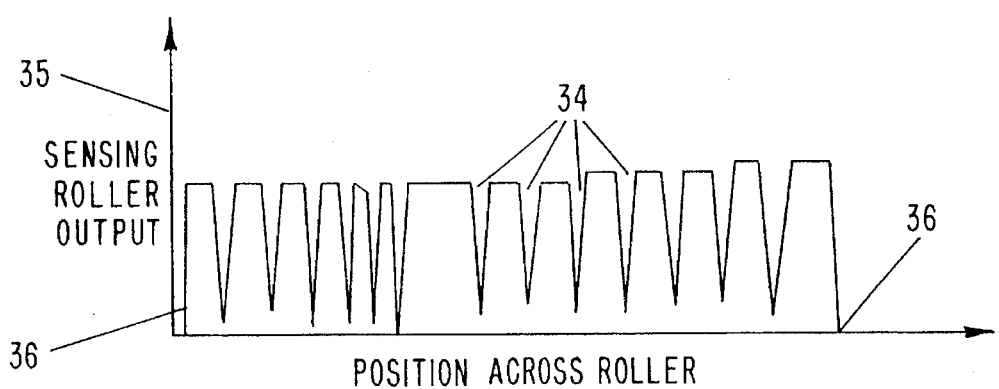
FIGURE — 3B

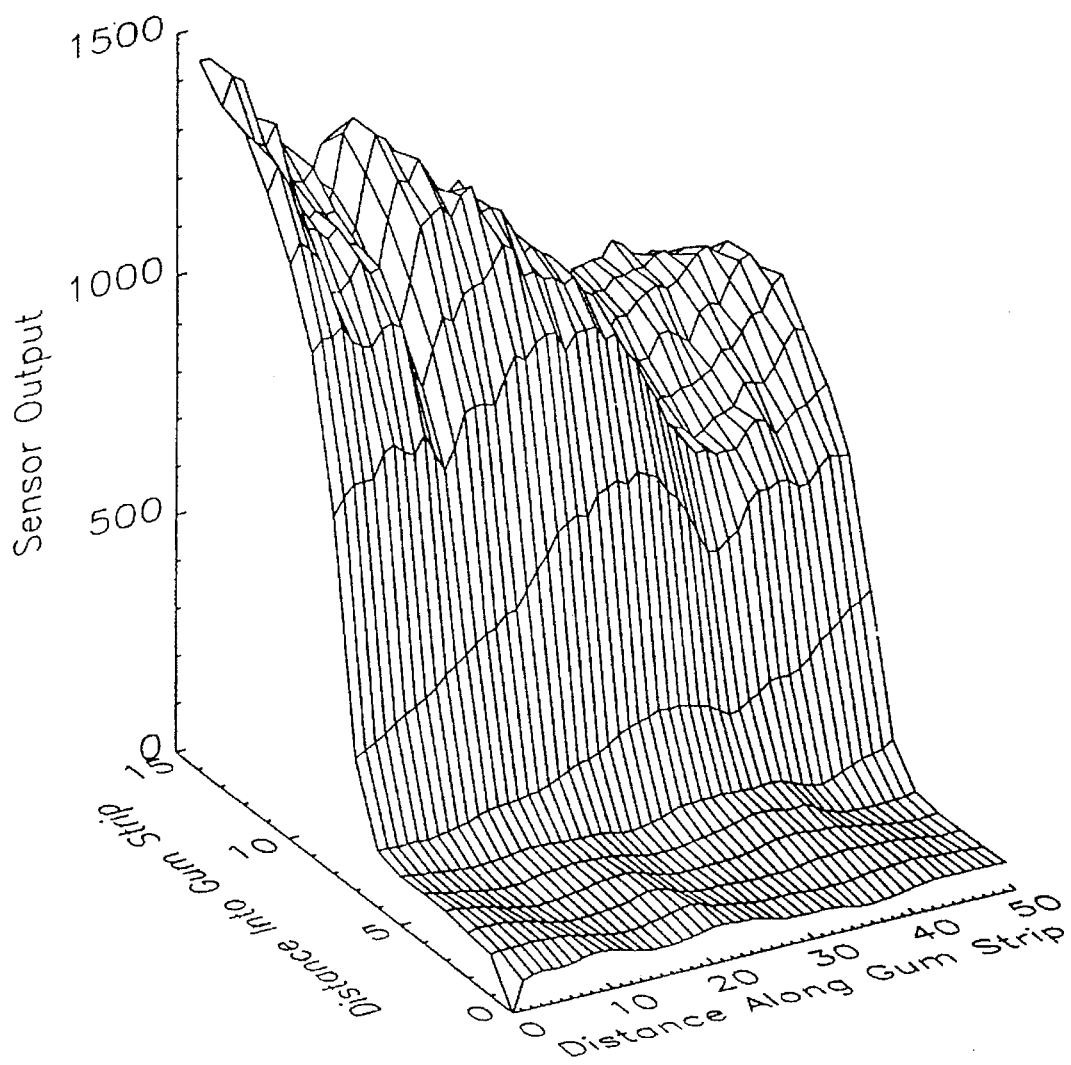
FIGURE — 4

5,537,048

SENSING ROLLER FOR IN-PROCESS THICKNESS MEASUREMENT

GOVERNMENT RIGHTS

The Government has rights to this invention pursuant to Contract No. DE-AC04-76DP00789 awarded by the U.S. Department of Energy.

BACKGROUND OF THE INVENTION

1. Field of the Invention (Technical Field)

The present invention relates to apparatuses and methods for in-process sensing of materials transported through roller-based conveyor systems.

2. Background Art

Many manufacturing processes require processing of bulk materials in belt form, ranging from thin sheets of plastics to synthetic polymers with embedded steel wires. These materials are often transported over roller-based conveyor systems to permit a continuous processing stream from station to station.

Processing such bulk materials involves cutting, layering, bonding, and lamination steps which require precise knowledge of the belt position in real-time. However, there are few sensors currently available for monitoring material position during transportation on a conveyor system. The space above the conveyor is typically occupied by processing equipment and is unavailable. In addition, the conveyor environment is often dirty, contaminated with oil, smoky, and subject to extremes in temperature. This harsh environment severely restricts the type of sensors which may be profitably used.

However, significant improvements in product quality and waste minimization can potentially be achieved through the use of on-line belt position sensing. For example, a process at one manufacturer involves positioning a 1" wide "gum strip" at the edge of a wide belt. If the gum strip extends over the edge, the piece (belt plus gum strip) must be scrapped. Because the current manual positioning system is inaccurate, the process specifies a nominal ¼" safety margin. This margin reduces the incidence of scrapped belts, but results in reduced quality material.

The present invention addresses this problem by permitting real-time monitoring of the belt position during transportation over a conveyor system. Acquiring this information permits closed loop control of processing systems based upon the measured belt position. The sensing roller described herein can immediately benefit presently installed manufacturing equipment. The manufacturing process described above, for example, contains mechanical guides which can modify the gum strip placement based upon electrical command inputs. The position information collected by the sensing roller can be coupled to these command inputs to provide closed-loop control of gum strip placement.

There are no known general purpose systems in place for monitoring the edges of conveyor-transported dielectric materials, the edges of laminated structures such as the gum strip/belt assembly, or measuring the position of wires within layers of dielectric. Researchers have experimented with a vision-based system for monitoring the position of a belt as it moves down a conveyor. Such systems function poorly due to the variations of the reflectivity and color of the material, as well as the factory lighting. In addition, a vision-based system must occupy space above the conveyor, and is subject to error due to smoke, airborne oils, and contamination of optical surfaces.

U.S. Pat. No. 4,623,835, entitled "Web Thickness Sensor Using Loop-Gap Resonator", to Mehdizadeh, et al., discloses a device for measuring the capacitance between a conductive roller and an externally mounted electrode to determine the thickness of a dielectric material. The apparatus required the presence of a conductor on the top side of the belt material being processed. The present invention eliminates this requirement by placing both electrodes on the roller itself.

U.S. Pat. No. 4,968,947, entitled "Apparatus for the Non-Destructive Measurement of the Ohmic Resistance of Thin Layers", to Thorn, measures the ohmic resistance of thin layers of conductive material on the top side of a belt of dielectric material. Again, this apparatus requires the presence of a conductor on the top side of the belt material.

The sensing roller of the present invention permits measuring the 1) thickness profile of the bulk material, 2) the location of material edges, and 3) the position and orientation of conductive wires within belts. The sensor is integrated into the roller used for transport of the material and does not occupy premium space above the conveyor. The sensing roller can be made from rugged materials currently used in rollers and can be incorporated into existing conveyor systems. These characteristics will permit application of closed-loop process control in many demanding applications.

SUMMARY OF THE INVENTION
(DISCLOSURE OF THE INVENTION)

The present invention is of a sensing roller apparatus and of a method of processing a material through a sensing roller, comprising: providing to the sensing roller a plurality of electrodes, each of the electrodes comprising a ring of conductive material; disposing a dielectric ring between two adjacent electrodes of the plurality of electrodes; providing electrical currents through each of the electrodes; and passing the material over the sensing roller. In the preferred embodiment, the invention involves determination of a capacitance or impedance between two adjacent electrodes of the plurality of electrodes from electrical currents provided through two adjacent electrodes (most preferably between every two adjacent electrodes), and then determination of characteristics of the material (such as thickness of the material and location of conductive matter within the material) from the capacitances or impedances. Preferably, determining characteristics comprises analyzing the capacitances or impedances by computer and controlling the processing of the material based on feedback from the analysis. The electrodes and dielectric rings preferably all have a substantially identical diameter and the electrical currents are provided to the electrodes via rotary electrical contact assemblies. A shielding electrode device may be placed between adjacent electrodes of the plurality of electrodes to improve protrusion of electric fields out from the surface of the sensing roller.

A primary object of the present invention is to permit sensing of thickness, edge location, and position of conductive wires information regarding dielectric belt materials being transported in a manufacturing process.

Another object of the present invention is to permit such information sensing without expensive retrofit of existing manufacturing operations.

A primary advantage of the present invention is that no modification of the material being transported is required to permit information sensing.

Another advantage of the present invention is that the information supplied is in a form readily processible by computer to enable precise control of manufacturing processes involving belts of dielectric material.

An additional advantage of the present invention is that sensing may be performed without occupying space above the conveyor.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 2 illustrates capacitance information output from the present invention given an illustrated segment of a rubber belt with a gum strip;

FIG. 3 illustrates capacitance information output from the present invention given an illustrated segment of a dielectric material with embedded metal wires; and FIG. 4 is an exemplary capacitive image of a gum strip on a belt provided by a high resolution capacitive imaging sensor.

DESCRIPTION OF THE PREFERRED EMBODIMENTS

BEST MODES FOR CARRYING OUT THE INVENTION

Figure 1:
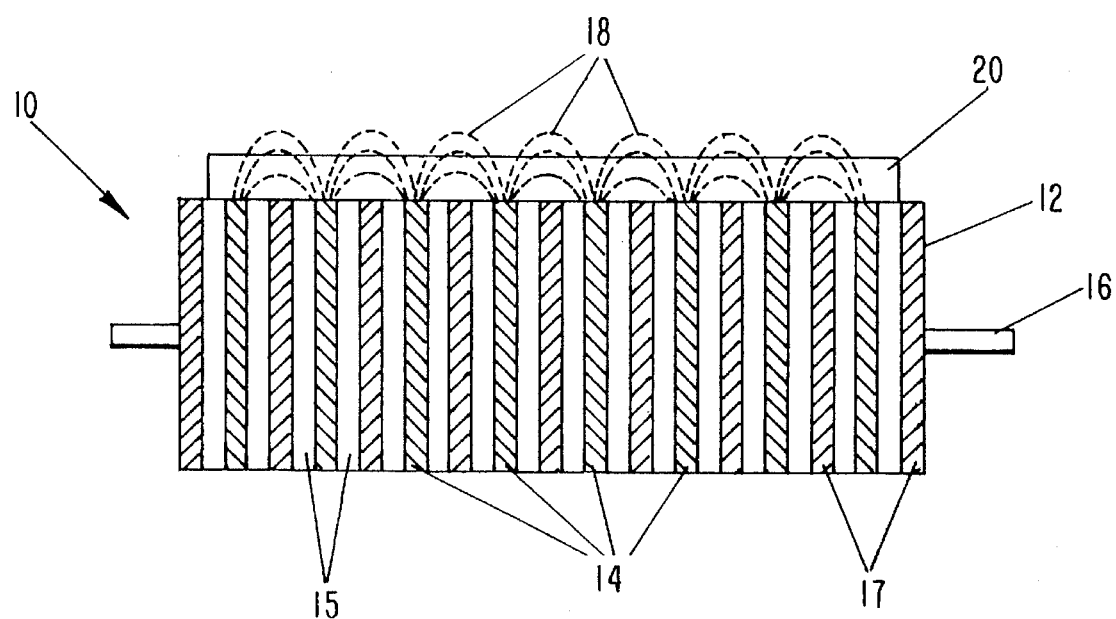
FIG. 1 illustrates the preferred embodiment of the present invention.

The present invention is of a sensing roller apparatus and method for measuring the 1) thickness profile of a dielectric bulk material being transported through a roller-based conveyor system; 2) the location of the material's edges; and 3) the position and orientation of conductive wires within the material. The sensor is integrated into the roller used for transport of the material and does not occupy space above the conveyor.

A schematic diagram of the sensing roller 10 of the present invention is given in cross-section in FIG. 1. An electric field is imposed between pairs of sensor electrodes 14 embedded in the roller 12 itself. The material between the metal electrodes 14 is a hard dielectric 15 which provides the mechanical strength and rolling surface, and, optionally, a shielding electrode 17. Alternatively, the sensor electrodes 14 may be located below the surface of the roller and covered by a thin layer of dielectric to provide a smooth, inert roller surface.

Shaft 16 preferably comprises rotary electrical contact assemblies to provide operable connections to each of the electrode pairs 14, such as those assemblies available from Meridian Laboratory.

An electric field 18 exists within the dielectric bulk substrate material or belt 20 as well as in the surrounding air. The mutual capacitance between each pair of electrodes 14 is a function of the geometry of the electrode pair 14, substrate 20, and air in the electric field. The capacitances along the axis of the roller are measured, for example, using a charge amplifier and synchronous detection electronics. Shielding electrodes 17 improve the protrusion of electric fields 18 out from the sensing roller.

As the material 20 moves over the roller 12, the capacitance readings depend upon the electrode geometry, the electrical properties of the substrate, and the substrate thickness. By monitoring the capacitances across the roller 12 with multiple sensor electrode pairs 14, by means of electrical connections within shaft 16, a profile of the substrate thickness may be obtained, as in FIG. 2. (In both FIGS. 2 and 3, the anticipated sensor outputs 27 or 35, respectively, are plotted directly beneath the sensor locations on the roller.) At the edges of the belt 22 and gum strip 24, the capacitance reading changes significantly, indicating the belt edges 28 and gum strip edges 26. Note that the position of the edges can be determined more precisely by decreasing the spacing between the sensors, especially in the areas near the edges of the material.

FIG. 3 illustrates another important capability of the sensing roller of the present invention, which is particularly applicable to the tire industry. Belts of rubber 30 often contain long steel wires 32 which add structural strength and tear resistance. The sensing roller 12 can monitor the position of these metal wires 32 through the rubber 30 and provide feedback to the rubber/wire/rubber laminating machine to control the interwire gaps and orientation. Again, the sensing roller output 35 shows the edges of the rubber 36 and the locations of the wires 34.

As will be understood by those skilled in the art, impedance sensing can be done using the same apparatus, rather than capacitance sensing. This is of value for materials with a resistive as well as a dielectric component. For example, carbon-loaded rubber has a certain resistivity associated with it in addition to its dielectric properties. These impedance measurements will involve recording both the magnitude and phase of the return signal.

By incorporating the sensors into the conveyor rollers themselves, the system: 1) does not require any additional space above the conveyor; 2) assures intimate contact between the bulk material and the sensors, thereby improving accuracy; 3) provides a rugged, reliable sensor which can operate for long periods of time; and 4) can be incorporated into many currently in-use systems by merely replacing a roller and making electrical connections.

The sensing roller apparatus and method of the invention can be applied to manufacturing operations which require precise alignment of materials moving along conveyors. The sensor can "see through" dielectric materials such as rubber, permitting alignment of multiple layers of material. The dynamic range will likely allow sensing material profiles up to 1" thick.

A typical application might involve using the sensor of the present invention in the gum-strip application process required for manufacturing automotive tire treads. In this process, a gum strip is attached to a bias ply belt consisting of rubber with embedded wires. The location of the gum strip is critical to subsequent processing operations; tire quality is maximized when the gum strip is located directly adjacent to the edge of the belt. Using the sensing roller of the present invention, the position of the gum strip on the belt can be monitored in real-time. This permits the use of feedback control to precisely position the gum strip at the edge of the belt.

The present invention provides, for the first time, the abilities to: 1) monitor the position of a dielectric belt form the underside; 2) monitor the relative position of additional belts applied to achieve a layered structure; and 3) monitor the position of conductive wires contained within the rubber belt. In addition, the sensing roller may be fabricated to be extremely rugged using standard techniques and also quite inexpensively.

Industrial Applicability

The invention is further illustrated by the following nonlimiting example.

Previous experiments involving Sandia National Laboratories' High Resolution Capacitive Imaging Sensor (HIRCIS) (described in U.S. Pat. No. 5,281,921), and Capacitive Paint Thickness (CAPT) sensor demonstrate the applicability of the sensing roller apparatus and method of the invention. For example, a sample of belt material was obtained and the HIRCIS sensor enabled detection of the edge of a gum strip on a belt.

Referring to FIG. 4, the foreground area is the top surface of the belt. The gum strip position is clearly evident by the rapid rise in capacitance to a new, higher level. Variations in the top surface of the gum strip are exaggerated in this figure due to a nonlinear, uncompensated gain. The sensor gain may be linearized in practice. The sensing roller of the present invention provides data corresponding to a slice of the image of FIG. 4. Known signal processing techniques using sensor transfer functions and nonlinear least squares estimation can extract the precise location of the edge from this information.

The preceding example can be repeated with similar success by substituting the generically or specifically described reactants and/or operating conditions of this invention for those used in the preceding example.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, patents, and publications cited above are hereby incorporated by reference.

What is claimed is:

1. A sensing roller apparatus comprising:

a plurality of electrodes, each of said electrodes comprising an uninterrupted circumferential ring of conductive material;

a plurality of dielectric rings, each of said dielectric rings disposed between adjacent electrodes of said plurality of electrodes;

means for providing electric fields between said adjacent electrodes of said plurality of electrodes;

means for measuring an electrical property between said adjacent electrodes of said plurality of electrodes, said property being selected from the group consisting of capacitance and impedance; and means for determining characteristics of a substantially dielectric material passing through said electric fields from said property;

wherein said sensing roller apparatus supports said substantially dielectric material.

2. The apparatus of claim 1 wherein said providing means comprises rotary electrical contact means.

3. The apparatus of claim 1 comprising means for simultaneously measuring said property between every two adjacent electrodes of said plurality of electrodes.

4. The apparatus of claim 1 additionally comprising a plurality of shielding electrode means, each of said shielding electrode means disposed between two adjacent electrodes of said plurality of electrodes.

5. The apparatus of claim 1 wherein said means for determining characteristics of a material comprises means for determining thicknesses.

6. The apparatus of claim 1 wherein said means for determining characteristics of a material comprises means for determining locations of conductive matter within the material.

7. The apparatus of claim 1 wherein said means for determining characteristics comprises computer means.

8. The apparatus of claim 1 additionally comprising means for controlling processing of the material based on feedback from an output of said means for determining characteristics.

9. The apparatus of claim 1 wherein each of said rings of conductive material and each of said dielectric rings have a substantially identical diameter.

10. A sensing roller apparatus comprising:

a plurality of electrodes, each of said electrodes comprising a ring of conductive material;

a plurality of dielectric rings, each of said dielectric rings disposed between adjacent electrodes of said plurality of electrodes;

means for providing electric fields between said adjacent electrodes of said plurality of electrodes;

means for measuring an electrical property between said adjacent electrodes of said plurality of electrodes, said property being selected from the group consisting of capacitance and impedance; and means for determining characteristics of a substantially dielectric material passing through said electric fields from said property, said determining means comprising means for determining locations of conductive matter within the substantially dielectric material;

wherein said sensing roller apparatus supports said substantially dielectric material.

11. A method of processing and supporting a substantially dielectric material by a sensing roller, the method comprising the steps of:

a) providing the sensing roller with a plurality of electrodes, each of the electrodes comprising a ring of conductive material;

b) disposing a dielectric ring between adjacent electrodes of the plurality of electrodes;

c) providing electrical fields between adjacent electrodes of the plurality of electrodes;

d) passing the substantially dielectric material through the electric fields while supported by the sensing roller;

e) measuring an electrical property between adjacent electrodes of the plurality of electrodes, the property being selected from the group consisting of capacitance and impedance: and f) determining characteristics of the substantially dielectric material from the property, comprising determining locations of conductive matter within the substantially dielectric material.

12. A method of processing and supporting a substantially dielectric material by a sensing roller, the method comprising the steps of:

a) providing the sensing roller with a plurality of electrodes, each of the electrodes comprising an uninterrupted circumferential ring of conductive material;

b) disposing a dielectric ring between adjacent electrodes of the plurality of electrodes;

c) providing electrical fields between adjacent electrodes of the plurality of electrodes;

d) passing the substantially dielectric material through the electric fields while supported by the sensing roller; and e) measuring an electrical property between adjacent electrodes of the plurality of electrodes, the property being selected from the group consisting of capacitance and impedance.

13. The method of claim 12 additionally comprising the step of disposing a shielding electrode means between two adjacent electrodes of the plurality of electrodes.

14. The method of claim 12 wherein the measuring step comprises simultaneously measuring the property between every two adjacent electrodes comprising the plurality of electrodes.

15. The method of claim 14 additionally comprising the step of determining characteristics of the material from the property.

16. The method of claim 15 wherein the step of determining characteristics of the material comprises determining thicknesses.

17. The method of claim 15 wherein the step of determining characteristics of the material comprises determining locations of conductive matter within the material.

18. The method of claim 15 wherein the step of determining characteristics comprises processing the capacitances or impedances by computer means.

19. The method of claim 15 additionally comprising the step of controlling the processing of the material based on feedback from an output of the step of determining characteristics of the material.

20. The method of claim 12 wherein the steps of providing a plurality of electrodes and disposing dielectric rings comprise providing and disposing rings having a substantially identical diameter.

21. The method of claim 12 wherein the step of providing electric fields comprises providing rotary electrical contact means to each of the electrodes.

* * * * *